United States Patent
Kim et al.

(10) Patent No.: US 8,824,171 B2
(45) Date of Patent: Sep. 2, 2014

(54) HOLD-UP TIME EXTENDING CIRCUIT AND CONVERTER INCLUDING THE SAME

(75) Inventors: Jin-Tae Kim, Seoul (KR); Hyun-Chul Eom, Seoul (KR); Shanmei Li, Bucheon (KR); Kwang-Il Lee, Bucheon (KR); Hojae Lee, Seoul (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 388 days.

(21) Appl. No.: 13/196,575

(22) Filed: Aug. 2, 2011

(65) Prior Publication Data

US 2012/0033457 A1 Feb. 9, 2012

(30) Foreign Application Priority Data

Aug. 5, 2010 (KR) .................. 10-2010-0075544

(51) Int. Cl.
  *H02M 3/335* (2006.01)
  *H02M 1/00* (2006.01)
(52) U.S. Cl.
  CPC .. *H02M 3/33553* (2013.01); *H02M 2001/0096* (2013.01)
  USPC ....................................... 363/21.04

(58) Field of Classification Search
  USPC ............... 363/21.01–21.04, 21.06–21.11
  See application file for complete search history.

(56) References Cited

U.S. PATENT DOCUMENTS

| 7,516,338 B2* | 4/2009 | Park ........................... 713/300 |
| 7,548,437 B2* | 6/2009 | Choi et al. .................. 363/21.09 |
| 7,888,919 B2* | 2/2011 | Dishman et al. ............. 323/266 |
| 2010/0188871 A1* | 7/2010 | Kim et al. .................... 363/21.03 |

* cited by examiner

*Primary Examiner* — Adolf Berhane
*Assistant Examiner* — Yemane Mehari
(74) *Attorney, Agent, or Firm* — Okamoto & Benedicto LLP

(57) ABSTRACT

The present invention relates to a hold-up time expansion circuit and a converter including the same. The hold-up time expansion circuit controls switching frequency of at least one switch according to the input voltage of the converter. The converter is dependent on the switching frequency that is controlled by the hold-up time expansion circuit, and controls the duty of at least one switch according to the feedback signal of the output voltage.

14 Claims, 5 Drawing Sheets

HOLD-UP TIME EXTENDING CIRCUIT AND CONVERTER INCLUDING THE SAME

CROSS-REFERENCE TO RELATED APPLICATION

This application claims priority to and the benefit of Korean Patent Application No. 10-2010-0075544 filed in the Korean Intellectual Property Office on Aug. 5, 2010, the entire contents of which are incorporated herein by reference.

BACKGROUND (a) Field

The disclosed technology relates to a circuit capable of expanding a hold-up time, and a converter including the same.

(b) Description of the Related Technology

An input terminal of a converter is connected to ac-rectifying circuit of which an ac input is rectified and dc is supplied, or an output of a power factor compensation circuit.

When the voltage of the ac-rectifying or the output voltage of the power factor circuit is decreased or blacks out, the output voltage of the converter decreases. A period between a time when the input voltage starts to decrease and a time when the input voltage becomes lower than a threshold voltage is referred to as a hold-up time. The threshold voltage means a minimum input voltage that can constantly maintain the output voltage of the converter.

If the input voltage is less than the threshold voltage, an error operation is generated. For an example, if the input voltage of a half-bridge converter is less than the threshold voltage, a duty of main or auxiliary switches must increase to constantly maintain the output voltage of the half-bridge converter.

However, the maximum duty of the both switches is limited to 50% to prevent short-circuit of the both switches so that the output voltage cannot be maintained constantly during the condition In an asymmetric half-bridge converter, a duty of the main or auxiliary switch is limited to 50%, but another is not it. If the duty ratio of the switch increases more than 50%, the abnormal operation like that the output voltage rapidly reduces can occur because a voltage conversion ratio of the converter is inverted. For those reasons, the maximum duty of the switches in the topologies is limited.

The input terminal of the converter is connected to a DC link capacitor to smooth the input voltage. To increase the hold-up time, the capacitance of the DC link capacitor must be increased. This causes an increase of the production cost and the circuit size.

The above information disclosed in this background section is only for enhancement of understanding of the background of the invention and therefore it may contain information that does not form the prior art that is already known in this country to a person of ordinary skill in the art.

SUMMARY

Embodiments of the present invention are directed to a hold-up time expansion circuit and a converter.

A converter generating an output voltage by converting an input voltage according to an embodiment of the present invention includes: at least one switch operating to generate the output voltage; a leakage inductor helping at least one switch to switch at a zero voltage; a hold-up time expansion circuit controlling a switching frequency of at least one switch according to an input voltage; and a switch controller operating at least one switch according to the switching frequency.

The hold-up time expansion circuit includes: an input voltage sensing unit sensing the input voltage; and a frequency setting unit controlling the impedance according to the sensed input voltage, wherein the switching frequency is determined according to the impedance.

The hold-up time expansion circuit further includes a transistor operating according to the sensed input voltage, and if the transistor is turned on, the frequency setting unit decreases the impedance, while if the transistor is turned off, the frequency setting unit increases the impedance.

The input voltage sensing unit includes: a first resistor having one terminal input with the input voltage, and a second resistor having one terminal connected to the other terminal of the first resistor and the other terminal that is grounded, wherein the transistor is switched by the current flowing to the nodes of the first resistor and the second resistor.

The frequency setting unit includes: a capacitor connected in parallel to the transistor and having one terminal that is grounded; a first resistor having one terminal connected to the other terminal of the capacitor; and a second resistor including one terminal connected to the other terminal of the first resistor and the other terminal that is grounded.

The switch controller includes an oscillator generating a frequency modulation current according to impedance controlled by the hold-up time expansion circuit, copying the frequency modulation current to generate the first current and the second current, generating a triangular wave signal that is increased by the first current and decreased by the second current, and generating a clock signal having an edge that is synchronized with a peak and a minimum of the triangular wave signal.

The hold-up time expansion circuit further includes a transistor switched according to the input voltage, and if the transistor is turned on, the frequency setting unit decreases the impedance, while if the transistor is turned off, the frequency setting unit increases the impedance.

The frequency setting unit includes: a capacitor connected in parallel to the transistor and having one terminal that is grounded; a first resistor having one terminal connected to the other terminal of the capacitor; and a second resistor including one terminal connected to the other terminal of the first resistor and the other terminal that is grounded, wherein the frequency modulation current is supplied to the frequency setting unit.

The oscillator includes: a control transistor including a first electrode connected to the other terminal of the first resistor and one terminal of the second resistor and the second electrode connected to a power source voltage to generate the frequency modulation current; and an error amplifier including an output terminal connected to the gate electrode of the control transistor, a first input terminal connected to the first electrode, and a second input terminal input with the reference voltage, wherein the frequency modulation current flowing through the control transistor is increased as the error of the reference voltage and the first electrode voltage is increased.

The oscillator further includes: a triangular wave capacitor charged by the first current and discharged by the second current, thereby generating the triangular wave signal; a first comparator comparing the triangular wave signal with the first voltage; a second comparator comparing the triangular wave signal with the second voltage; and an SR flip-flop generating the clock signal according to the output of the first comparator and the second comparator, wherein the SR flip-flop decreases the clock signal if the triangular wave signal reaches the first voltage, and increases the clock signal if the triangular wave signal reaches the second voltage.

A hold-up time expansion circuit according to an embodiment of the present invention expands a hold-up time such that a decreased input voltage is decreased to a threshold voltage by a DC link capacitor. The threshold voltage is a voltage to generate an output voltage by converting an input voltage. The hold-up time expansion circuit includes: an input voltage sensing unit sensing an input voltage; a transistor operating a switching according to the sensed input voltage; and a frequency setting unit of which impedance is changed according to the switching operation of the transistor.

The frequency setting unit includes: a capacitor connected in parallel to the transistor and having one terminal that is grounded; a first resistor having one terminal connected to the other terminal of the capacitor; and a second resistor including one terminal connected to the other terminal of the first resistor and the other terminal that is grounded.

A hold-up time expansion circuit of an embodiment of the present invention is applied to a converter including a leakage inductor for zero voltage switching of at least one switch that is switched to generate an output voltage by converting an input voltage.

The hold-up time expansion circuit includes: an input voltage sensing unit sensing the input voltage; a transistor that is switched according to the sensed input voltage; and a frequency setting unit of which impedance is changed according to the switching operation of the transistor.

The frequency setting unit includes: a capacitor connected in parallel to the transistor and having one terminal that is grounded; a first resistor having one terminal connected to the other terminal of the capacitor; and a second resistor including one terminal connected to the other terminal of the first resistor and the other terminal that is grounded.

Embodiments of the present invention provide a hold-up time expansion circuit and a converter including the same that are capable of increasing the hold-up time.

DETAILED DESCRIPTION OF THE EMBODIMENTS

Figure 1:
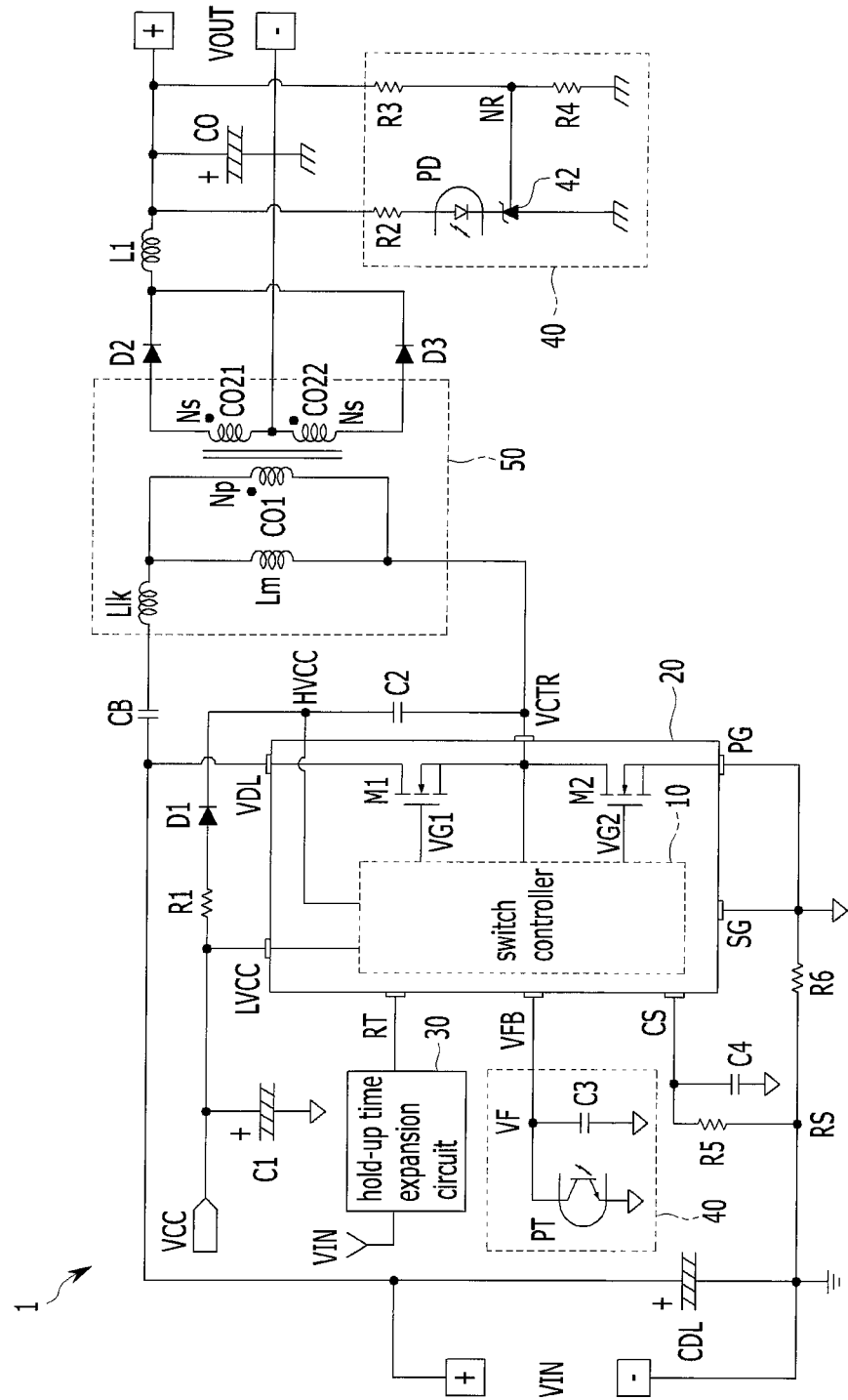
FIG. 1 is a view showing a converter applied with a hold-up time expansion circuit according to an embodiment of the present invention.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

Hereinafter, a method and an apparatus for cancellation of a transient voltage spike according to an embodiment of the present invention will be described in detail with reference to the accompanying drawings.

FIG. 1 is a view of a converter applied with a hold-up time expansion circuit according to an embodiment of the present invention. FIG. 1 shows a half-bridge converter, however the present invention is not limited thereto. The present invention may be all applied to a converter having a leakage inductance.

The half bridge converter 1 includes a DC link capacitor CDL connected to an input terminal. The DC link capacitor CDL smoothes the input voltage VIN.

The half bridge converter 1 converts the output voltage VOUT in the required voltage range. The output transistor M1 and the output transistor M2 convert the input voltage VIN, and are operated according to a predetermined switching frequency to generate the output voltage VOUT. The half bridge converter 1 includes the output transistor M1 and an integrated circuit 20 controlling the switching operation of the output transistor M2.

The output transistor M1 and the output transistor M2 are respectively realized as metal-oxide semiconductor field effect transistors (MOSFET), and are integrated in the integrated circuit 20 in an embodiment of the present invention. However, the present invention is not limited thereto. For example, the output transistor M1 and output transistor M2 are IGBTs (insulated gate bipolar transistors), or may be separated from the integrated circuit 20. Also, the integrated circuit 20 may control the switching of a single output transistor (not shown) instead of two output transistors M1 and M2. The integrated circuit 20 may control switching of each of the output transistor M1 and the output transistor M2 according to pulse frequency modulation (PFM).

The half bridge converter 1 includes a transformer 50 to convert the input voltage VIN and generate the output voltage VOUT. The transformer 50 includes a primary coil CO1 and two secondary coils CO21 and CO22. The two secondary coils CO21 and CO22 are referred to as the second coil and the third coil, and the primary coil CO1 is referred to as the first coil.

A leakage inductance and a magnetizing inductance are present between the primary coil CO1 and the secondary coils CO21 and CO22 of the transformer 50. In FIG. 1, the leakage inductance is shown as a leakage inductor Llk, and the magnetizing inductance is shown as a magnetizing inductor Lm in the circuit view. The first coil CO1 is a coil having a turn number Np, and the second coil CO21 and the third coil CO22 are coils having a turn number Ns. The current and voltage of the primary coil are converted according to the turn ratio of the primary coil and the secondary coils, and are transmitted to the secondary coils.

The diode D2 rectifies the current flowing in the second coil CO21, and the diode D3 rectifies the current flowing in the third coil CO22. The ripple component of the current passing through the diode D2 and the diode D3 is decreased by the inductor L1, and is absorbed by the capacitor CO. The output voltage VOUT becomes the DC voltage by the L-C filter including the inductor L1 and the capacitor CO.

A blocking capacitor CB is connected between the transformer 50 and the DC link capacitor CDL. The blocking capacitor CB has the function of filtering the DC component of the input voltage. Also, the resonance is generated between the blocking capacitor CB and the leakage inductor Llk such that a parasitic capacitor (not shown) formed between the terminals of the output transistor M1 and the output transistor M2 is discharged.

For the zero-voltage switching of the output transistors M1 and M2, the voltage of both terminals must be 0 volts at the turn-on time of the output transistors M1 and M2. The parasitic capacitor of the output transistors M1 and M2 must be discharged for the voltage of both terminals of the output transistors M1 and M2 to be 0 volts. To discharge the parasitic capacitor of the output transistors M1 and M2, a power providing the discharging current is necessary. In an embodiment of the present invention, the power charged to the leakage inductor Llk provides the current for discharging the parasitic capacitor of the output transistors M1 and M2. In detail, the power charged to the leakage inductor Llk generates the resonance current by the resonance between the leakage inductor Llk and the blocking capacitor CB, and the resonance current discharges the parasitic capacitor of the output transistors M1 and M2.

The power source voltage VCC is a voltage to generate the power source voltage required to operate the switch controller 10 and the output transistors M1 and M2.

The noise is removed by the capacitor C1 such that the power source voltage VCC is input to the switch controller 10 through the LVCC pin of the integrated circuit 20. The power source voltage VCC charges the capacitor C2 through the resistor R1 and the diode D1. The voltage charged to the capacitor C2 is input to the switch controller 10 through the HVCC pin.

The integrated circuit 20 includes a VDL pin electrically connected to the output transistor M1 (hereinafter referred to as "an upper transistor".), a PG pin for the power ground, and an SG pin for a control ground. The switch controller 10 is connected to the ground through the SG pin.

Also, the integrated circuit 20 includes an LVCC pin supplied with the power source voltage VCC to generate an inner bias voltage for the operation of the switch controller 10, and an HVCC pin supplied with the power source voltage for the operation of the upper gate driver driving the upper transistor M1. Also, the integrated circuit 20 includes a VCTR pin electrically connected to the drain of the output transistor M2 (hereinafter referred to as "a lower transistor"), a VFB pin input with a feedback signal VF that is changed according to the output voltage VOUT, a CS pin sensing the current flowing through the lower transistor M2 and for enabling/disabling the protection operation of the integrated circuit 20, and an RT pin to set up the operation frequency of the half bridge converter 1.

The RT pin of the integrated circuit 20 is connected to a hold-up time expansion circuit 30 according to an embodiment of the present invention.

If the hold-up time expansion circuit 30 senses the input voltage VIN and the input voltage VIN is decreased less than a predetermined voltage, the operation frequency of the half bridge converter 1 is decreased. The operation frequency means the switching frequency of the upper transistor M1 and the lower transistor M2. The hold-up time expansion circuit 30 is formed outside the integrated circuit 20, but the present invention is not limited thereto, and it may be formed inside the integrated circuit 20.

The switch controller 10 may include a current control oscillator (100 of FIG. 2A) to operate the upper transistor M1 and the lower transistor M2 with a frequency determined by the current flowing outside the RT pin. The voltage of the RT pin may be maintained as a constant voltage (for example 2 VDC). If the impedance of the RT pin is decreased, the current flowing outside the RT pin is increased such that the operation frequency is increased. If the impedance of the RT pin is increased, the current flowing outside the RT pin is decreased such that the operation frequency is decreased. The hold-up time expansion circuit 30 will be described with reference to FIG. 3.

The resistor R5 and resistor R6 are connected in series between the CS pin and the ground, and the CS pin is connected to the capacitor C4. A negative voltage (hereinafter a sense voltage) is generated at the node of the resistor R5 and the resistor R6 by the current flowing in the resistor R6 during the period in which the lower switch M2 is turned on. The noise is removed by the capacitor C4 such that the sense voltage RS is input to the switch controller 10. The switch controller 10 controls the protection operation for protecting the integrated circuit 20 from overloading and overheating by using the sense voltage.

The half bridge converter 1 includes a feedback signal generator 40 generating a feedback signal determining the duty of the upper switch M1 and the lower switch M2 according to the output voltage VOUT.

The feedback signal generator 40 generates the feedback signal VF flowing to the output voltage VOUT by using an opto coupler including an opto diode PD and an opto transistor PT. The resistor R2 is connected to the anode of the opto diode PD and the output voltage VOUT. The cathode of a shunt regulator 42 is connected to the cathode of the opto diode PD, and the anode of the shunt regulator 42 is grounded. The reference terminal of the shunt regulator 42 is input with the voltage (the voltage of the node NR) of which the output voltage VOUT is divided by the resistor ratio of the resistor R3 and the resistor R4. The shunt regulator 42 increases the current flowing in the opto diode PD by a value of which the voltage input to the cathode is higher than the voltage of the node NR input to the reference terminal.

That is, the current flowing in the opto diode PD is changed according to the output voltage VOUT.

The current of the opto transistor PT is dependent on the current flowing in the opto diode PD. The collector of the opto transistor PT is connected to the capacitor C3, and the emitter is grounded. As the current of the opto transistor PT is increased, the capacitor C3 is discharged such that the feedback signal VF is decreased. In contrast, as the current of the opto transistor PT is decreased, the capacitor C3 is charged by the current supplied from the switch controller 10 through the VFB pin such that the feedback signal VF is increased.

Next, a switch controller 10 determining the switching frequency by the hold-up time expansion circuit according to the embodiment of the present invention will be described with reference to FIG. 2A and 2B.

Figure 2A:
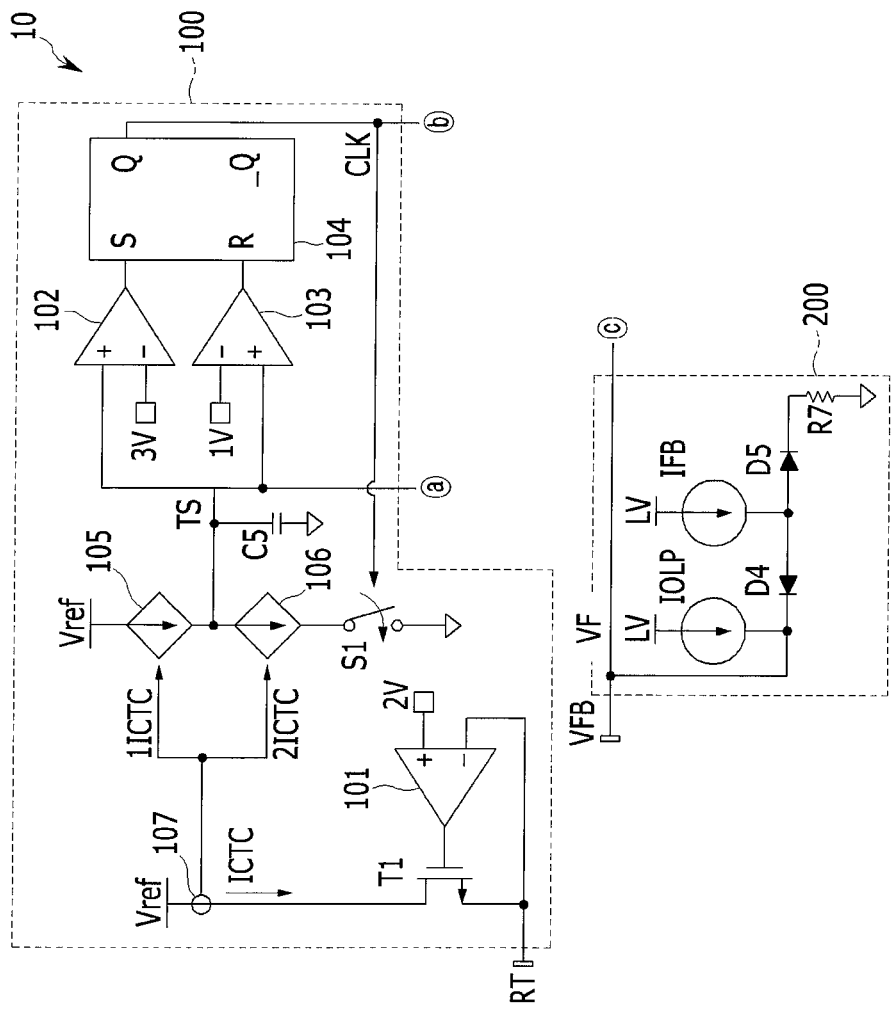
FIG. 2A and 2B are views showing a switch controller according to an embodiment of the present invention.
Figure 2B:
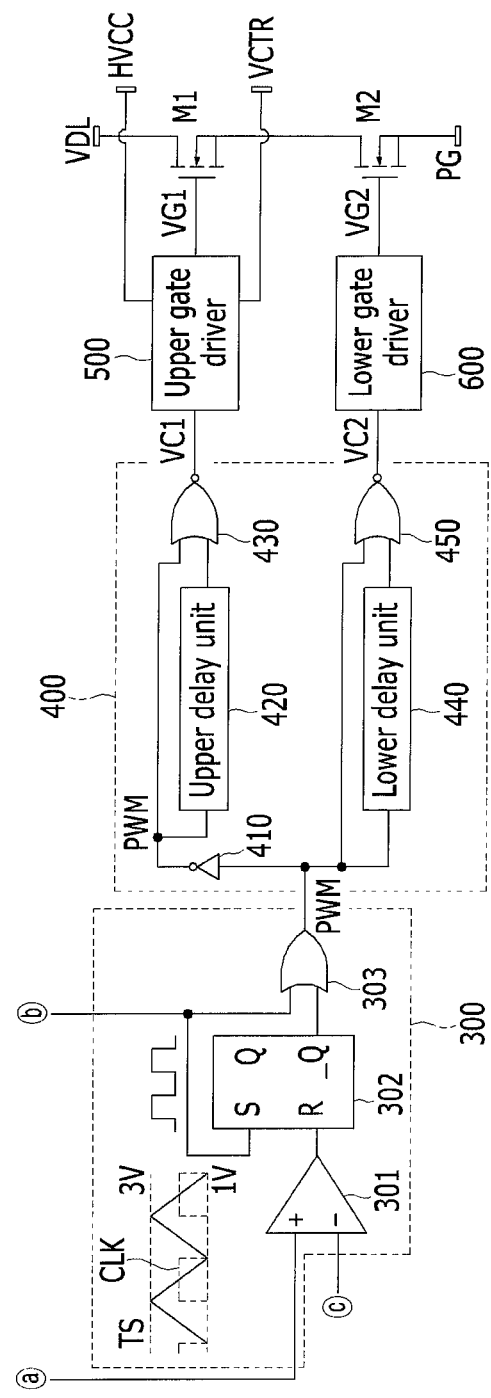

FIG. 2A and 2B are views showing a switch controller according to an embodiment of the present invention.

The switch controller 10 includes the oscillator 100, a feedback unit 200, a PWM controller 300, a delay unit 400, an upper gate driver 500, and a lower gate driver 600.

The oscillator 100 generates a triangular wave signal TS and a clock signal CLK having a frequency depending on the frequency modulation current ICTC supplied to the hold-up time expansion circuit 30 through the RT pin.

As the impedance of the RT pin is increased, the current flowing out to the RT pin is decreased such that the frequency modulation current ICTC is decreased, and in contrast, as the impedance of the RT pin is decreased, the current flowed out to the RT pin is increased such that the frequency modulation current ICTC is increased.

The output terminal of an error amplifier 101 is connected to the gate electrode of the control transistor T1 to maintain the voltage of the RT pin as the reference voltage 2V. The error amplifier 101 amplifies the error found when comparing the voltage of the RT pin and the reference voltage 2V to output a voltage corresponding to the amplified error to the gate electrode of the control transistor T1.

If the impedance of the RT pin is decreased, the voltage of the RT pin is decreased and the error with the reference voltage 2V is increased. Thus, the error amplifier 101 increases the voltage of the gate electrode of the control transistor T1 to increase the frequency modulation current ICTC.

If the impedance of the RT pin is increased, the voltage of the RT pin is increased and the error with the reference voltage 2V is decreased. Thus, the error amplifier 101 decreases the voltage of the gate electrode of the control transistor T1, and thereby the frequency modulation current ICTC is decreased.

As described above, 2V is one example, but the present invention is not limited thereto. The source electrode of the control transistor T1 is connected to the RT pin, and the drain electrode of the control transistor T1 is connected to the reference voltage Vref. The frequency modulation current ICTC is generated by the power source voltage Vref, and the magnitude of the frequency modulation current ICTC is controlled by the error amplifier 101.

If the hold-up time expansion circuit 30 decreases the impedance connected to the RT pin, the current flowing to the RT pin is increased such that the frequency modulation current ICTC is increased. If the frequency modulation current ICTC is increased, the frequency of the triangular wave signal TS and the clock signal CLK is increased such that the switching frequency is increased. If the hold-up time expansion circuit 30 increases the impedance connected to the RT pin, the current flowing to the RT pin is decreased such that the frequency modulation current ICTC is decreased. If the frequency modulation current ICTC is decreased, the frequency of the triangular wave signal TS and the clock signal CLK is decreased such that the switching frequency is increased.

A current mirror unit 107 copies the frequency modulation current ICTC with a first ratio and a second ratio to transmit them to a charge dependant current source 105 and a discharge dependant current source 106. In an embodiment of the present invention, the first ratio is set as 1 and the second ratio is set as 2, however the present invention is not limited thereto.

The charge dependant current source 105 charges the capacitor C5, and the discharge dependant current source 106 discharges the triangular wave capacitor C5 during the period in which the switch S1 is turned on. The voltage charged to the triangular wave capacitor C5 becomes the triangular wave signal TS. The switch S1 is turned on by the high level of the clock signal CLK and is turned off by the low level of the clock signal CLK.

When the triangular wave signal TS is more than the reference voltage 3V, a first comparator 102 outputs the signal of the high level, and when the triangular wave signal TS is less than the reference voltage 3V, it outputs the signal of the low level. The reference voltage 3V is one example as the peak of the triangular wave signal TS, and the present invention is not limited thereto.

When the triangular wave signal TS is more than the reference voltage 1V, a second comparator 103 outputs the signal of the low level, and when the triangular wave signal TS is less than the reference voltage 1V, it outputs the signal of the high level. The reference voltage 1V is one example as the minimum of the triangular wave signal TS, and the present invention is not limited thereto.

An SR flip-flop 104 outputs a signal of the high level through the output terminal Q in synchronization with the increasing edge of the signal input to the set terminal S, and outputs a signal of the low level through the output terminal Q in synchronization with the increasing edge of the signal input to the reset terminal R. The signal output through the output terminal Q of the SR flip-flop 104 is the clock signal CLK.

Accordingly, the clock signal CLK is the high level at the time that the triangular wave signal TS reaches 3V, and the clock signal CLK is the low level at the time that the triangular wave signal TS reaches 1V.

Also, the switch S1 is turned on by the clock signal CLK of the high level at the time that the triangular wave signal TS reaches 3V. Thus, the capacitor C5 is discharged by the discharge dependant current source 106 such that the triangular wave signal TS starts to be decreased. The switch S1 is turned off by the clock signal CLK of the low level at the time that the triangular wave signal TS reaches 1V. Thus, the capacitor C5 is charged by the charge dependant current source 105 such that the triangular wave signal TS starts to be increased.

The feedback unit 200 includes two diodes D4 and D5, a resistor R7, a feedback current source IFB, and an overload current source IOLP that are generated by the voltage LVCC. The current passing through the diode D4 among the current of the feedback current source IFB and the current of the overload current source IOLP is supplied to the feedback signal generator 40. The current passing through the diode D5 among the current of the feedback current source IFB is supplied to the resistor R7.

The overload current source IOLP supplies the current to increase the feedback signal VF after the time that the feedback signal VF is increased such that the diode D4 is turned off. When the feedback signal VF is increased to the voltage of the level at which the diode D4 is turned off, the load is the output terminal is very large. From this time, the current of the overload current source IOLP is only supplied to the feedback signal generator 40 such that the feedback signal VF is increased. After the diode D4 is turned off, if the feedback signal VF is increased to more than the predetermined threshold voltage, the switch controller 10 is determined as the overload, and thereby the protection operation may be enabled.

The current of the overload current source IOLP is very small compared with the current of the feedback current source IFB such that when it is not an overload, the influence for the generation of the feedback signal VF is small.

The current supplied to the feedback signal generator 40 among the current of the feedback current source IFB is supplied through the diode D4 such that the anode voltage of the diode D4 is less than the feedback signal VF, and the current supplied to the feedback signal generator 40 is blocked. The anode voltage of the diode D4 is the same as the anode voltage of the diode D5, and the anode voltage of the diode D5 is determined according to the voltage of the resistor R7.

When the value of the resistor R7 is large, the anode voltage of the diode D5 is increased such that the anode voltage of the diode D4 is increased. Thus, the voltage level of the feedback signal VF of the turn-off time of the diode D4 is increased. In contrast, when the value of the resistor R7 is small, the anode voltage of the diode D5 and the diode D4 is low such that the voltage level of the feedback signal VF of the turn-off time of the diode D4 is decreased.

In this way, the level of the feedback signal VF may be controlled according to the value of the resistor R7. The duty of the upper switch M1 and the lower switch M2 is controlled by using the feedback signal VF and the triangular wave signal TS such that the duty of the upper switch M1 and the lower switch M2 may be controlled by using the resistor R7. The duty may be controlled by using the resistor R7 such that the maximum value of the current that may flow to the upper switch M1 and the lower switch M2 is determined according to the resistor R7.

The PWM controller 300 controls the switching operation of the upper switch M1 and the lower switch M2 according to the result of comparing the feedback signal VF and the triangular wave signal TS, and the clock signal CLK.

The PWM controller 300 includes a PWM comparator 301, an SR flip-lop 302, and an OR gate 303.

If the triangular wave signal TS is more than the feedback signal VF, the PWM comparator 301 generates the signal of the high level, and if the triangular wave signal TS is less than the feedback signal VF, the signal of the low level signal is output.

The SR flip-flop 302 outputs the signal of the low level to the inversion output terminal −Q in synchronization with the increasing edge of the clock signal CLK input to the set terminal S, and outputs the signal of the high level to the inversion output terminal −Q in synchronization with the increasing edge of the output signal of the PWM comparator 301 input to the reset terminal S.

The OR gate 303 outputs the pulse width modulation signal PWM of the high level if at least one of the clock signal CLK and the output signal SR of the inversion output terminal −Q of the flip-flop 302 is the high level. The OR gate 303 outputs the pulse width modulation signal PWM of the low level if both of the clock signal CLK and the output signal SR of the inversion output terminal −Q of the flip-flop 302 are the low level.

After the output signal of the inversion output terminal −Q of the SR flip-flop 302 is the low level in synchronization with the increasing edge of the clock signal CLK, the pulse width modulation signal PWM becomes the low level in synchronization with the decreasing edge of the clock signal CLK. The output signal of the inversion output terminal −Q of the SR flip-flop 302 becomes the high level at the time that the triangular wave signal TS that is increased reaches the feedback signal VF in the state that the clock signal CLK is the low level. Thus, the OR gate 303 generates the pulse width modulation signal PWM of the high level.

The pulse width modulation signal PWM of the low level turns on the lower switch M2, and the pulse width modulation signal PWM of the high level turns on the upper gate signal M1.

The delay unit 400 generates an upper gate control signal VC1 and a lower gate control signal VC2 controlling the switching operation of the upper switch M1 and the lower switch M2 to have a predetermined dead time according to the pulse width modulation signal PWM.

The delay unit 400 includes an inverter 410, an upper delay unit 420, a NOR gate 430, a lower delay unit 440, and a NOR gate 450.

The inverter 410 inverse the pulse width modulation signal PWM to output the inversion pulse width modulation signal/PWM.

The NOR gate 430 outputs the upper gate control signal VC1 of the high level if the inversion pulse width modulation signal/PWM and the output signal of the upper delay unit 420 are both the low level. The NOR gate 430 outputs the upper gate control signal VC1 of the low level if at least one of the inversion pulse width modulation signal/PWM and the output signal of the upper delay unit 420 is the high level.

The lower delay unit 440 outputs the pulse width modulation signal PWM in synchronization with the decreasing edge of the pulse width modulation signal PWM to the NOR gate 450 after the predetermined delay time.

The NOR gate 450 outputs the lower gate control signal VC2 of the high level if the pulse width modulation signal PWM and the output signal of the lower delay unit 440 are both the low level. The NOR gate 450 outputs the lower gate control signal VC2 of the low level if at least one of the pulse width modulation signal PWM and the output signal of the lower delay unit 440 is the high level.

The upper gate driver 500 outputs the upper gate signal VG1 according to the upper gate control signal VC1. The upper gate driver 500 generates the upper gate signal VG1 into the level that is capable of turning on/off the upper switch M1 according to the voltage input through the HVCC pin and the VCTR pin.

The lower gate driver 600 outputs the lower gate signal VG2 according to the lower gate control signal VC2.

Figure 3:
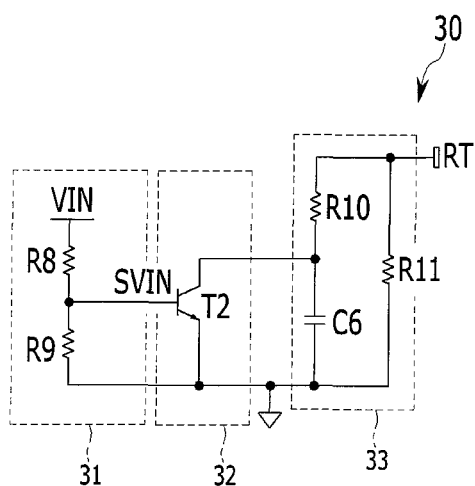
FIG. 3 is a view showing a hold-up time expansion circuit 30 according to an embodiment of the present invention.

FIG. 3 is a view showing a hold-up time expansion circuit according to an embodiment of the present invention. The hold-up time expansion circuit 30 may be realized by various methods, and FIG. 3 is one example.

The hold-up time expansion circuit 30 includes an input voltage sensing unit 31, a frequency shifter 32, and a frequency setting unit 33.

The input voltage sensing unit 31 divides the input voltage VIN to the resistor R8 and the resistor R9 to generate the sense input voltage SVIN according to the input voltage VIN.

The frequency shifter 32 includes a BJT T2, and the BJT T2 is switched according to the sense input voltage SVIN. The impedance of the frequency setting unit 33 is changed according to the switching operation of the BJT T2.

The frequency setting unit 33 changes the impedance to change the switching frequency. The frequency setting unit 33 includes a resistor R10, a capacitor C6 connected in series to the resistor R10, and a resistor R11.

One terminal of each of the resistor R10 and the resistor R11 is connected to the RT pin, the other terminal of the resistor R10 is connected to one terminal of the capacitor C6, and the other terminal of the resistor R11 is grounded. The capacitor C6 is connected in parallel to the BJT T2, and the other terminal of the capacitor C6 is grounded.

If the input voltage VIN is decreased such that the sense input voltage SVIN becomes the level that is capable of turning off the BJT T2, the impedance of the frequency setting unit 33 is increased by the turn-off of the BJT T2.

When the BJT T2 is turned on, the resistor R10 and the resistor R11 are connected in parallel such that the impedance connected to the RT pin is low. If the BJT T2 is turned off, the capacitor C6 is coupled in series to the resistor R10 such that the impedance of the RT pin is increased. During the time that the capacitor C6 is charged by the frequency modulation current ICTC through the resistor R10, the capacitor C6 is charged such that the frequency modulation current ICTC is slowly decreased. The voltage of both terminals of the resistor R10 is decreased according to the decrease of the frequency modulation current ICTC.

If the normal state in which the capacitor C6 is not charged further by the frequency modulation current ICTC is reached, the frequency modulation current ICTC only flows to the resistor R11. Here, the frequency modulation current ICTC is smaller than the current when the resistor R10 and the resistor R11 are connected in parallel, and thereby the switching frequency is decreased.

Equation 1 shows a conversion ratio between the input voltage VIN and the output voltage VOUT.

$$nVOUT = \frac{Lm}{Lm+Llk} \cdot 2 \cdot VIN \cdot D \cdot (1-D) - \frac{4 \cdot IOUT}{n} \cdot Llk \cdot fs \quad \text{(Equation 1)}$$

In Equation 1, n is the turn ratio Ns/Np of the first coil CO1 and the second coil CO21 (or the third coil CO22), D is the duty of the lower switch M2, (1−D) is the duty of the upper switch M1, IOUT is the output current of the half-bridge converter 1 supplied to the load, and fs is the switching frequency. Equation 1 is the conversion ratio of the asymmetric half-bridge converter 1.

As shown in Equation 1, the switching frequency fs is one of the causes of decreasing the conversion ratio between the input voltage VIN and the output voltage VOUT. As the switching frequency fs is increased, the duty loss is increased. In Equation 1, the duty loss is represented by "4*IOUT*Llk*fs/n".

As shown in Equation 1, the leakage inductor Llk is the cause of the duty loss. The leakage inductor Llk is necessary for the zero voltage switching operation, however, as the leakage inductor Llk is increased, the duty loss is increased. Like with the upper and lower switches M1 and M2, the difference between the conversion ratio of the input voltage and the output voltage according to the entire duty of the switches that are operated to generate the output voltage and the conversion ratio of the real input voltage and the real output voltage is referred to as the duty loss.

According to an embodiment of the present invention, when the input voltage VIN is decreased, the switching frequency fs is decreased such that the decrease of the conversion ratio according to the decrease of the input voltage VIN may be compensated. The period hold-up time in which the input voltage is decreased to the threshold voltage may be expanded by compensating the decrease of the conversion ratio.

Figure 4:
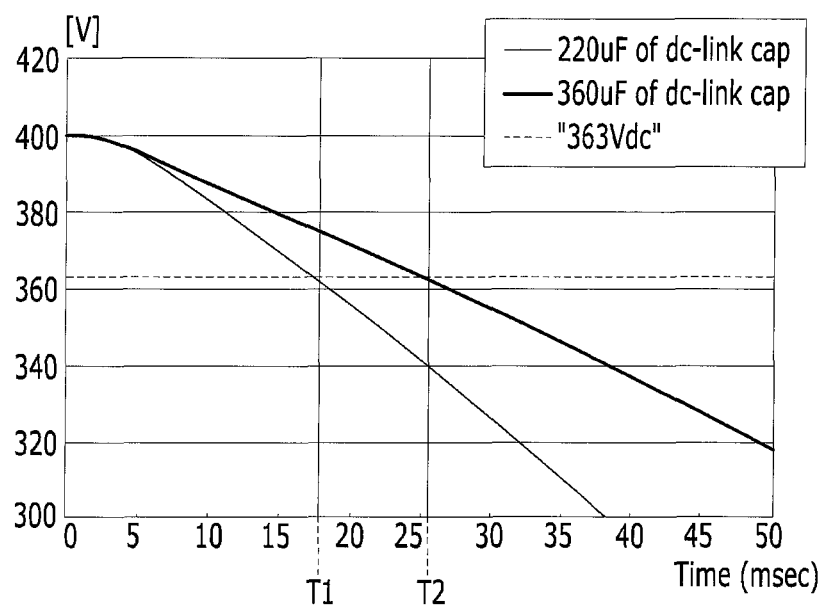
FIG. 4 is a graph of a hold-up time according to an embodiment of the present invention.

FIG. 4 is a graph showing an expanded hold-up time according to an embodiment of the present invention.

In FIG. 4, the thin line is a curve of an input voltage decrease of a conventional half-bridge converter, and the thick line is a curve of an input voltage decrease of a half-bridge converter according to an embodiment of the present invention. The threshold voltage is set as 363 Vdc.

As shown in FIG. 4, the input voltage of the half-bridge converter according to an embodiment of the present invention reaches the threshold voltage at the time T2. The input voltage of the conventional half-bridge converter reaches the threshold voltage at the time T1. That is, the hold-up time is expanded by the period T2-T1.

The DC link capacitor must be increased to expand the hold-up time, and this is the cause of the production cost increase and the circuit size increase. Although the capacitance of the DC link capacitor CDL of the half-bridge converter according to an embodiment of the present invention is 220 uF, the input voltage curve according to an embodiment of the present invention has the same input voltage decrease curve as the conventional half-bridge converter of which the capacitance of the DC link capacitor is 360 uF.

As described above, the hold-up time expansion circuit and the converter including the same according to an embodiment of the present invention may expand the hold-up time without the capacitance change of the DC link capacitor.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS half bridge converter 1, output transistor/upper transistor M1, output transistor/lower transistor M2, first coil CO1, second coil CO21 third coil CO22, switch controller 10, integrated circuit 20 hold-up time expansion circuit 30, feedback generator 40 transformer 50, diode (D1-D5), resistor (R1-R10), capacitor (C1-C6, CO) DC link capacitor CDL, oscillator 100, feedback unit 200 PWM controller 300, delay unit 400, upper gate driver 500 lower gate driver 600, error amplifier 101, comparator 102, 103, and 301 control transistor T1, switch S1, opto transistor PT opto diode PD, shunt regulator 42, leakage inductor Llk magnetizing inductor Lm, inductor L1, blocking capacitor CB

What is claimed is:

1. A converter generating an output voltage by converting an input voltage, comprising:
   at least one switch operating to generate the output voltage;
   a leakage inductor helping the at least one switch to switch at a zero voltage;
   a hold-up time expansion circuit controlling a switching frequency of the at least one switch according to the input voltage, the hold-up time expansion circuit changing the switching frequency of the at least one switch when the input voltage decreases such that a period hold-up time during which the input voltage decreases to a threshold voltage is extended; and
   a switch controller operating the at least one switch according to the switching frequency.

2. The converter of claim 1, wherein the hold-up time expansion circuit includes:
   an input voltage sensing unit sensing the input voltage to generate a sensed input voltage; and
   a frequency setting unit controlling an impedance according to the sensed input voltage,
   wherein the switching frequency is determined according to the impedance.

3. The converter of claim 2, wherein the hold-up time expansion circuit further includes a transistor operating according to the sensed input voltage, and when the transistor is turned on, the frequency setting unit decreases the impedance, while when the transistor is turned off, the frequency setting unit increases the impedance.

4. The converter of claim 3, wherein the input voltage sensing unit includes:
   a first resistor having a first terminal input with the input voltage; and
   a second resistor having a first terminal connected to a second terminal of the first resistor and a second terminal that is grounded, wherein the transistor is switched by current flowing to nodes of the first resistor and the second resistor.

5. The converter of claim 3, wherein the frequency setting unit includes:
   a capacitor connected in parallel to the transistor and having a first terminal that is grounded;
   a first resistor having a first terminal connected to a second terminal of the capacitor; and
   a second resistor including a first terminal connected to a second terminal of the first resistor and a second terminal that is grounded.

6. The converter of claim 2, wherein the switch controller includes an oscillator generating a frequency modulation current according to the impedance, copying the frequency modulation current to generate a first current and a second current, generating a triangular wave signal that is increased by the first current and is decreased by the second current, and generating a clock signal having an edge that is synchronized with a peak and a minimum of the triangular wave signal.

7. The converter of claim 6, wherein the hold-up time expansion circuit further includes a transistor switched according to the input voltage, and when the transistor is turned on, the frequency setting unit decreases the impedance, and when the transistor is turned off, the frequency setting unit increases the impedance.

8. The converter of claim 7, wherein the frequency setting unit includes:
   a capacitor connected in parallel to the transistor and having a first terminal that is grounded;
   a first resistor having a first terminal connected to a second terminal of the capacitor; and
   a second resistor including a first terminal connected to a second terminal of the first resistor and a second terminal that is grounded, wherein the frequency modulation current is supplied to the frequency setting unit.

9. The converter of claim 8, wherein the oscillator further includes:
   a control transistor including a first electrode connected to the second terminal of the first resistor and the first terminal of the second resistor and a second electrode connected to a power source voltage to generate the frequency modulation current; and
   an error amplifier including an output terminal connected to a gate electrode of the control transistor, a first input terminal connected to the first electrode, and a second input terminal input with the reference voltage,
   wherein the frequency modulation current flowing through the control transistor is increased as the error of the reference voltage and a voltage on the first electrode is increased.

10. The converter of claim 9, wherein the oscillator includes:
   a triangular wave capacitor charged by the first current and discharged by the second current, thereby generating the triangular wave signal;
   a first comparator comparing the triangular wave signal with a first voltage;
   a second comparator comparing the triangular wave signal with a second voltage; and
   an SR flip-flop generating the clock signal according to the output of the first comparator and the second comparator,
   wherein the SR flip-flop decreases the clock signal when the triangular wave signal reaches the first voltage, and increases the clock signal when the triangular wave signal reaches the second voltage.

11. A hold-up time expansion circuit comprising:
   an input voltage sensing unit sensing an input voltage to generate a sensed input voltage;
   a transistor switching at a switching frequency according to the sensed input voltage; and
   a frequency setting unit having an impedance that is changed according to the switching frequency of the transistor, the impedance being changed when the input voltage decreases to extend a hold-up time during which the input voltage decreases to a threshold voltage,
   wherein the threshold voltage is a voltage to generate the output voltage by converting the input voltage.

12. The hold-up time expansion circuit of claim 11, wherein the frequency setting unit includes:
   a capacitor connected in parallel to the transistor and having a first terminal that is grounded;
   a first resistor having a first terminal connected to a second terminal of the capacitor; and
   a second resistor including a first terminal connected to a second terminal of the first resistor and a second terminal that is grounded.

13. A hold-up time expansion circuit of a converter including a leakage inductor for zero voltage switching of at least one switch that is switched to generate an output voltage by converting an input voltage, comprising:
   an input voltage sensing unit sensing the input voltage to generate a sensed input voltage;
   a transistor that is switched according to the sensed input voltage; and
   a frequency setting unit having an impedance is changed according to a switching operation of the transistor, the impedance being changed when the input voltage decreases to extend a hold-up time during which the input voltage decreases to a threshold voltage.

14. The hold-up time expansion circuit of claim 13, wherein the frequency setting unit includes:
   a capacitor connected in parallel to the transistor and having a first terminal that is grounded;
   a first resistor having a first terminal connected to a second terminal of the capacitor; and
   a second resistor including a first terminal connected to a second terminal of the first resistor and a second terminal that is grounded.

* * * * *